Feb. 28, 1928.

E. R. BURTNETT

INTERNAL COMBUSTION ENGINE

Filed Feb. 26, 1925

1,660,860

Inventor:—
Everett R. Burtnett.
By Martin P. Smith, Atty.

Patented Feb. 28, 1928.

1,660,860

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INTERNAL-COMBUSTION ENGINE.

Application filed February 26, 1925. Serial No. 11,715.

My invention relates generally to internal combustion engines and more particularly to a head structure for an adjacent pair of comsbustion chambers, the principal objects of my invention being to provide a combined compression and combustion clearance chamber for two combustion cylinders whereby a uniform column movement of the charge volume will pass from one cylinder into the other during the function of residual scavenging and fresh charge induction without the mixing of the residual gases (the products of previous combustion) and the fresh charge, and further, to provide a charge stratification clearance chamber during compression, so that a very small fresh charge volume inducted during very light load operation of the engine, will burn efficiently and with successive regularity.

A further object of my invention is to form the combined compression and combustion clearance chamber, so that dilution of the small fresh charge volume by residual gases during light load operation of the engine will be minimized.

With the foregoing and other objects in view my invention consists in certain novel features of construction and arrangement of parts that will be hereinafter more fully described and claimed and illustrated in the accompanying drawings, in which:

Figure 1:
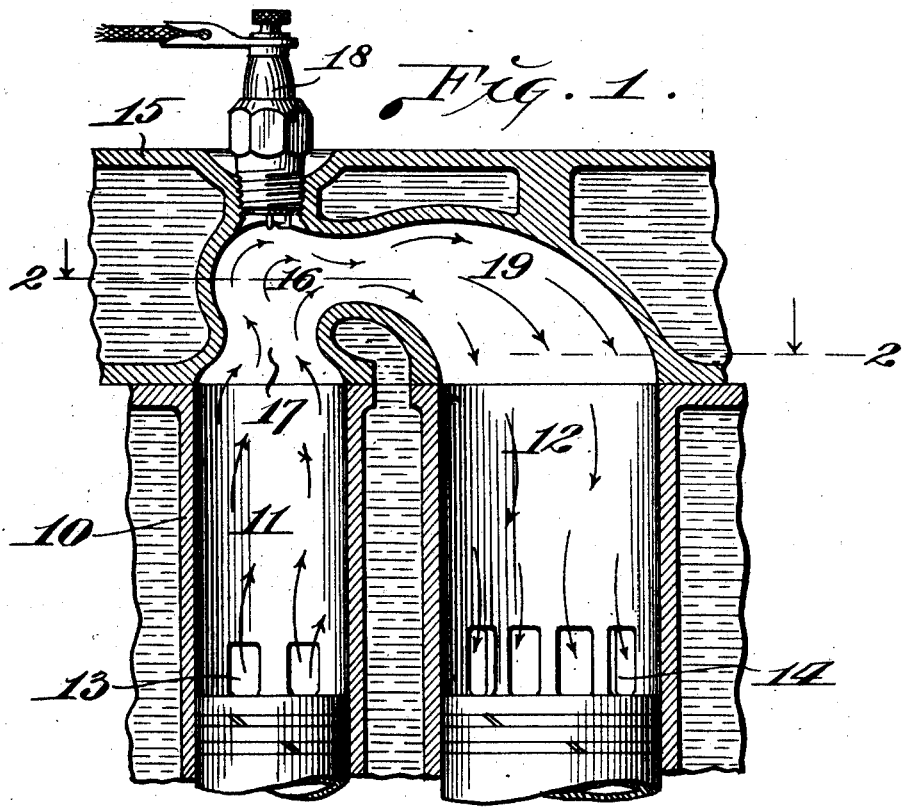
Fig. 1 is a vertical section taken through the centres of a pair of combustion cylinders and showing my improved head structure applied thereto.
Figure 2:
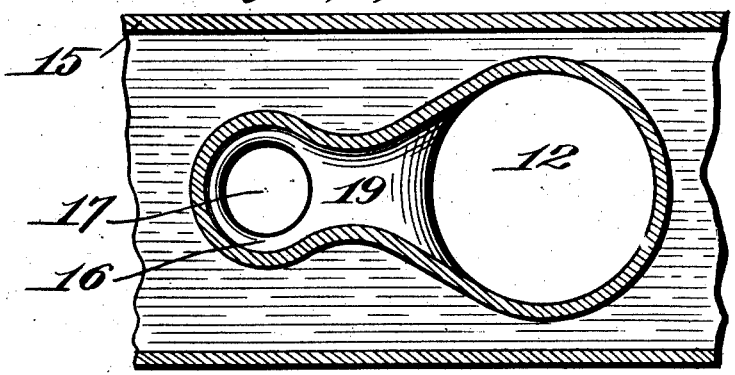
Fig. 2 is a horizontal section taken on the line 2—2 of Fig. 1.

Referring by numerals to the accompanying drawings, which illustrate a practical embodiment of my invention, 10 designates a portion of an internal combustion engine cylinder block in which are formed combustion chambers 11 and 12, the same being disposed adjacent to each other and with their axes parallel. Chamber 11 is provided with charge inlet ports 13 and chamber 12 is provided with exhaust ports 14. These inlet and exhaust ports are preferably located in the same horizontal plane and they are positioned so that they are wholly uncovered and open only when the pistons that operate within said combustion chambers are at the lower or outer ends of their travel.

The head or inner ends of the combustion chambers 11 and 12 are closed by a head block 15, the same being formed with a cell or series of cells through which may be circulated a fluid cooling medium.

Formed in head 15 and preferably at a point directly above the center of combustion chamber 11, having the inlet ports 13, is a substantially spherical chamber 16, and the lower portion thereof is connected by a short throat 17, with the upper end of combustion chamber 11. The lower end of this throat has the same diameter as that of combustion chamber 11 and the diameter of the upper portion of said throat is slightly less than the diameter of the chamber 16 and as a result of such construction a relatively short vertically disposed Venturi opening serves as a connection between the upper end of chamber 11 and the lower portion of said chamber 16.

Seated in the upper portion of head block 15 and in line with the centers of chambers 11 and 16, is an ignition device such as a spark plug 18 and the inner ends of the electrodes thereof project into the upper portion of chamber 16.

A laterally disposed chamber 19 leads from the side of chamber 16, through head 15, to the upper end of chamber 12. The diameter or cross sectional area of this chamber gradually increases from the point where it leaves chamber 16 to the point where it joins the upper end of combustion chamber 12, and thus gaseous fuel or the like that passes from chamber 16 to chamber 12, has a free sweep and may prgressively expand, so as to meet the full straight diameter bore of chamber 12.

As the pistons within chambers 11 and 12 reach their low or outer centers, ports 13 and 14 are simultaneously uncovered, with the result that a charge volume is admitted through inlet ports 13 and this charge volume passes rapidly upward through chamber 11, thence through throat 17, into chamber 16, thence through chamber 19 and thence downward through chamber 12 and in so doing this admitted charge volume drives before it the greater portion of the products of combustion resulting from the previously ignited fuel charge, and these products of combustion are driven out through exhaust ports 14. As the pistons start upward on their succeeding compression stroke, ports 13 and 14 are closed and during the remaining portion of the upward or inward travel of said pistons, the charge volume admitted to the combustion chambers and the common compression and combustion clearance as just described, together with whatever residual products of combustion remain in chamber 12, will be compressed within the common compression and combustion clearance, comprising the chambers 16, 17 and 19, until at the point of highest compression, or as the pistons pass high center, said compressed charge will be ignited by a spark produced between the terminals of sparkplug 18 and the rapid rise of expansion following combustion will be impressed directly upon the heads of the pistons to drive the same downward on their power stroke.

The particular form of the common compression and combustion clearance chamber permits a uniform column movement of the charge volumes from the chamber 11 having the inlet ports 13 to the chamber 12, having the exhaust ports and this column movement is effected with very little, if any, mixing of the residual gases that remain in chamber 12, with the fresh charge volume. Thus dilution of the admitted charge volume is minimized and the engine may be operated under very light load, inasmuch as the inducted charge volume will burn efficiently and with successive regularity. The spherical chamber 16, into which the terminals of the electrodes of the ignition device project, provides a charge stratification chamber during compression of the admitted fuel charge and thus insures ignition of the compressed charge under practically all conditions.

Thus it will be seen that I have provided a common compression and combustion clearance chamber for the adjacent combustion chambers of an internal combustion engine, which will be highly effective in the efficient and economical operation of the engine. It will be understood that minor changes in the size form and construction of the various parts of my improved internal combustion engine head structure may be made and substituted for those herein shown and described without departing from the spirit of my invention, the scope of which is set forth in the appended claim.

I claim as my invention:

In an internal combustion engine, a pair of combustion cylinders, a head closing the head ends of said cylinders and a common compression and combustion clearance chamber formed in said head and connecting the head ends of the combustion chambers in said cylinders, said common clearance chamber comprising a pair of Venturi passages disposed substantially at right angles to each other, the larger ends of said Venturi passages being connected respectively to the head ends of the combustion chambers, the smaller ends of said Venturi passages being connected to a substantially spherical chamber that is formed in the cylinder head in line with the axis of one of the combustion chambers and the throats that connect the Venturi passages with said spherical chamber being smaller in diameter than said chamber.

In testimony whereof I affix my signature.

EVERETT R. BURTNETT.